US012778169B2

(12) United States Patent
Khatau

(10) Patent No.: US 12,778,169 B2
(45) Date of Patent: Nov. 3, 2026

(54) PALM SAP SWEETENER AND MANUFACTURING PROCESS THEREFOR

(71) Applicant: LODAAT, LLC, Oak Brook, IL (US)

(72) Inventor: Rajiv Khatau, Oak Brook, IL (US)

(73) Assignee: LODAAT, LLC, Oak Brook, IL (US)

( * ) Notice: Subject to any disclaimer, the term of this patent is extended or adjusted under 35 U.S.C. 154(b) by 808 days.

(21) Appl. No.: 17/904,932

(22) PCT Filed: Feb. 26, 2021

(86) PCT No.: PCT/US2021/019843
§ 371 (c)(1),
(2) Date: Aug. 24, 2022

(87) PCT Pub. No.: WO2021/173950
PCT Pub. Date: Sep. 2, 2021

(65) Prior Publication Data

US 2023/0112660 A1 Apr. 13, 2023

Related U.S. Application Data

(60) Provisional application No. 62/981,892, filed on Feb. 26, 2020.

(51) Int. Cl.

| | |
|---|---|
| *A23L 27/30* | (2016.01) |
| *A23L 2/60* | (2006.01) |
| *A23L 33/125* | (2016.01) |
| *A23L 33/15* | (2016.01) |
| *A23L 33/16* | (2016.01) |

(52) U.S. Cl.
CPC ................ *A23L 27/33* (2016.08); *A23L 2/60* (2013.01); *A23L 33/125* (2016.08); *A23L 33/15* (2016.08); *A23L 33/16* (2016.08)

(58) Field of Classification Search
CPC ................................ A23L 2/60; A23L 33/125
See application file for complete search history.

(56) References Cited

U.S. PATENT DOCUMENTS

| | | | |
|---|---|---|---|
| 9,551,043 | B2 | 1/2017 | Van Haute et al. |
| 9,631,245 | B2 | 4/2017 | Broberg |
| 2013/0011524 | A1 | 1/2013 | Hareyama et al. |

OTHER PUBLICATIONS

Rao (2008) Thermophysical Properties of Sugarcane, Palmyra Palm, and Date-palm Granular Jaggery, International Journal of Food Properties, 11:4, 876-886, DOI: 10.1080/10942910701671281 (Year: 2008).*

Saputro et al., Eur Food Res Technol, DOI 10.1007/s00217-016-2734-9, (2016).

* cited by examiner

*Primary Examiner* — Michele L Jacobson

(74) *Attorney, Agent, or Firm* — Neal, Gerber & Eisenberg LLP

(57) ABSTRACT

The present disclosure relates to sweetener compositions, methods for preparing such sweetener compositions, and methods of using such sweetener compositions to treat or prevent a disease or condition associated with or exacerbated by blood sugar level excursions.

20 Claims, 1 Drawing Sheet

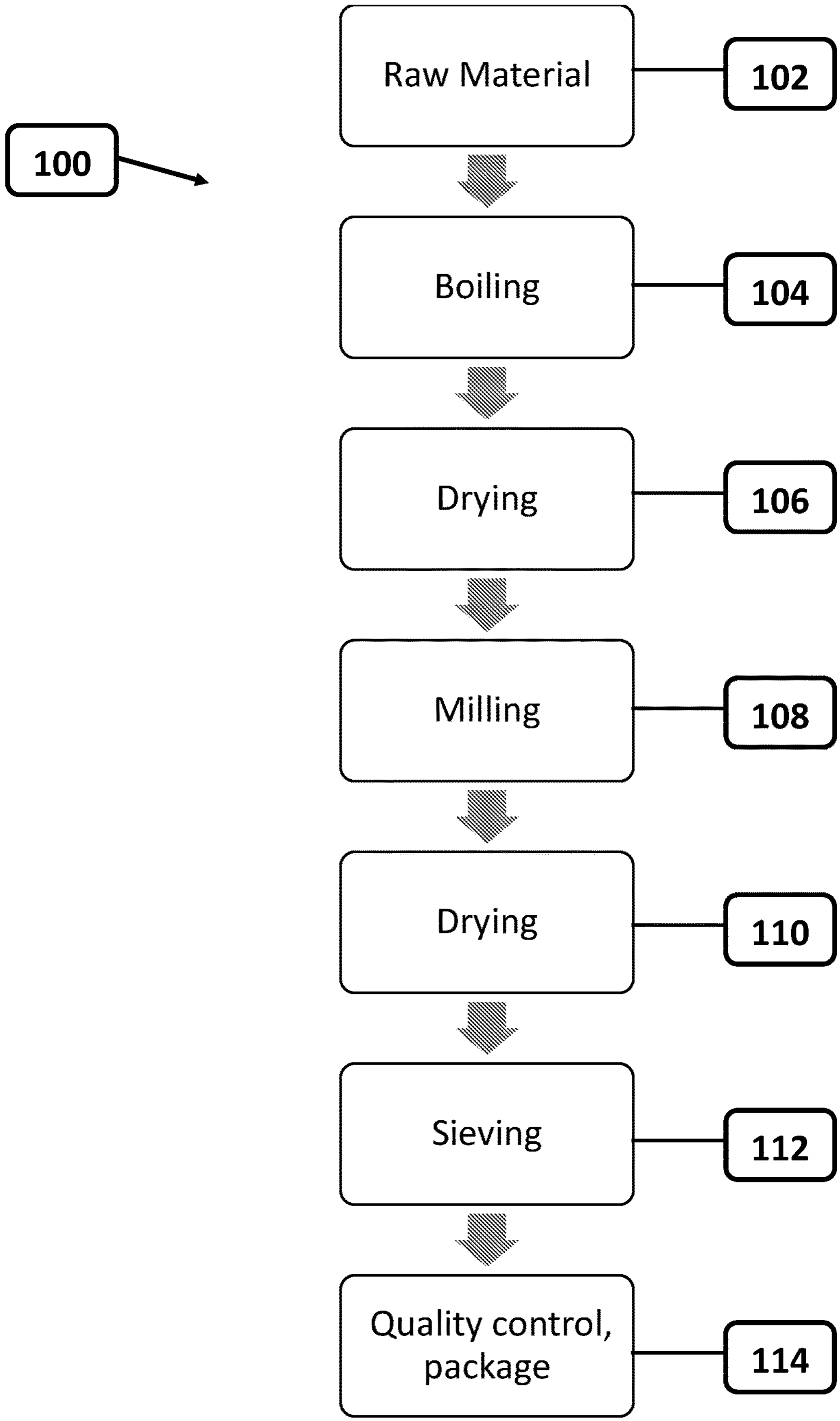
Raw Material
102
100
Boiling
104
Drying
106
Milling
108
Drying
110
Sieving
112
Quality control, package
114

PALM SAP SWEETENER AND MANUFACTURING PROCESS THEREFOR

CROSS REFERENCE TO RELATED APPLICATIONS

This application is a National Stage Entry of International Application Number PCT/US2021/019843, which was filed on Feb. 26, 2021 and claims priority to U.S. Provisional Patent Application No. 62/981,892, filed on Feb. 26, 2020. The entire contents of each of the aforementioned applications are herein incorporated by reference.

FIELD OF THE INVENTION

The present disclosure provides a sweetener composition and methods for manufacturing a sweetener composition to provide consistent, food-grade granules that may be consumed directly and/or admixed with and/or dissolved in products, such as food products or beverages.

BACKGROUND OF THE INVENTION

Natural caloric sweeteners, such as sucrose, glucose, and fructose, possess desirable taste characteristics, but they add to the caloric content of products without providing nutrients. Moreover, natural caloric sweeteners tend to have a relatively high glycemic index (GI), which is disruptive to blood sugar levels. The GI for glucose is 100.

There has been great consumer interest in low or non-caloric sweeteners that are considered as healthier alternatives. Non-caloric natural and synthetic high-potency sweeteners are known, but they most often possess negative characteristics. For example, *stevia* is expensive and has 30 to 150 times the sweetness of sugar. Moreover, *stevia* is associated with side effects such as bloating, nausea, gas, and muscle pain and has a somewhat bitter aftertaste. As another example, monk fruit is difficult to grow and has 150 to 200 the sweetness of sugar. Monk fruit also has an unpleasant aftertaste.

There is an unmet need for sweetener compositions and products containing such compositions that have a similar flavor profile to sugar, but have health benefits over sugar and known sugar substitutes, particularly in terms of nutrients and glycemic control.

SUMMARY OF THE INVENTION

The present disclosure relates to a nutrient-rich, low-glycemic crystalline sweetener composition that tastes, dissolves, and melts substantially like sugar. In particular, the present disclosure relates to a sweetener composition comprising jaggery. In certain embodiments, the sweetener composition further comprises vitamins, minerals, and/or phytonutrients. In some such embodiments, the sweetener composition comprises Vitamins $B_1$, $B_2$, $B_3$, $B_6$, and/or $B_{12}$. In some such embodiments, the sweetener composition comprises minerals such as iron and/or potassium. In certain embodiments, the sweetener composition has a moisture content less than about 5%, and, preferably, less than about 2%.

The present disclosure also relates to a process for manufacturing a sweetener composition. The process comprises the steps of (a) providing raw palm sap; (b) heating the raw palm sap at a temperature and for a time period sufficient to form a concentrate; (c) optionally, partially drying the concentrate to obtain a partially dried intermediate; (d) milling the concentrate of step (b) and/or the partially dried intermediate of step (c) to obtain granules; and (e) drying the granules to provide granules having a moisture content of 5% or less.

The present disclosure also relates to an orally consumable product comprising a sweetener composition disclosed herein and/or a sweetener composition manufactured by a method disclosed herein. In certain embodiments, the consumable product is a food product, a beverage, or a mix product intended to be combined with a food or beverage. In some such embodiments, the food product is a bar, a cookie, a muffin, or the like. In some such embodiments, the beverage is a ready-to-drink (RTD) beverage such as a juice, a shake, or the like. In some such embodiments, the mix product is in the form of a tablet, pellet, powder, granule, or the like which can be added to a food or beverage.

The present disclosure relates to a method for lowering hemoglobin A1c (HbA1c) levels in a subject in need thereof. In certain embodiments, the subject is a subject with diabetes or at risk for developing diabetes, particularly Type 2 diabetes. The method comprises orally administering to a subject a consumable product comprising a sweetener composition disclosed herein and/or a sweetener composition manufactured by a method disclosed herein. In certain embodiments, the oral administration occurs daily for at least 4, 8, 12, 24, or 48 weeks. In some such embodiments, the oral administration occurs daily for 12 weeks or more. In some such embodiments, the subject's HbA1c level is less than 7% following oral administration of a sweetener composition disclosed herein and/or a sweetener composition manufactured by a method disclosed herein for 8 or more, alternatively 12 or more, weeks.

The present disclosure relates to a method for increasing hemoglobin (Hb) levels in a subject in need thereof. In certain embodiments, the subject is a subject with diabetes or at risk for developing diabetes, particularly Type 2 diabetes. In certain embodiments, the subject is a subject with anemia or at risk for developing anemia, particularly iron deficiency anemia. The method comprises orally administering to a subject a consumable product comprising a sweetener composition disclosed herein and/or a sweetener composition manufactured by a method disclosed herein. In some such embodiments, the oral administration occurs daily for 8 weeks or more. In certain embodiments, the oral administration occurs daily for at least 1, 2, 3, 4, 5, 6, 7, or 8 weeks.

The present disclosure relates to a method for increasing red blood cell count in a subject in need thereof. In certain embodiments, the subject is a subject with anemia or at risk for developing anemia, particularly iron deficiency anemia. The method comprises orally administering to a subject a consumable product comprising a sweetener composition disclosed herein and/or a sweetener composition manufactured by a method disclosed herein. In certain embodiments, the oral administration occurs daily for at least 1, 2, 3, 4, 5, 6, 7, or 8 weeks. In some such embodiments, the oral administration occurs daily for 8 weeks or more.

The present disclosure also relates to a method for treating or preventing a disease or condition associated with or exacerbated by blood sugar level excursions. The method comprises orally administering to a subject a consumable product comprising a sweetener composition disclosed herein and/or a sweetener composition manufactured by a method disclosed herein. In certain embodiments, the oral administration occurs daily for at least 4, 8, 12, 24, or 48 weeks. In some such embodiments, the oral administration occurs daily for 12 weeks or more. In certain embodiments, the disease or condition is diabetes, particularly Type 2 diabetes.

The compositions, methods for manufacturing the compositions, products comprising the compositions, and methods for using the compositions are further described herein.

These and other objects of the invention are described in the following paragraphs. These objects should not be deemed to narrow the scope of the invention.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art.

FIG. 1 shows flow diagram depicting an exemplary manufacturing process for a sweetener composition.

DESCRIPTION OF THE INVENTION

This detailed description is intended only to acquaint others skilled in the art with the present invention, its principles, and its practical application so that others skilled in the art may adapt and apply the invention in its numerous forms, as they may be best suited to the requirements of a particular use. This description and its specific examples are intended for purposes of illustration only. This invention, therefore, is not limited to the embodiments described in this patent application, and may be variously modified.

This disclosure provides sweetener compositions and methods for manufacturing such sweetener compositions. The sweetener compositions disclosed herein taste, dissolve, and melt substantially like sugar. For example, sweetener compositions disclosed herein deliver a 1:1 sweetness of sugar up to 150×. However, the sweetener compositions disclosed herein have a low glycemic index. In addition, sweetener compositions disclosed are a source of nutrients, including vitamins (e.g., Vitamin B12) and minerals (e.g., iron). Thus, sweetener compositions disclosed herein provide a superior solution to myriad health problems as compared to current commercially available options.

Section headings as used in this section and the entire disclosure are not intended to be limiting.

A. Definitions

As used in the specification and the appended claims, unless specified to the contrary, the following terms have the meaning indicated:

The term "about" as used herein means approximately, and in most cases within 10% of the stated value.

An "effective amount" of a composition, as used herein, includes an amount sufficient to lower hemoglobin A1c (HbA1c) levels, increase hemoglobin (Hb) levels, and/or increase red blood cell count in the subject at specific periods after administration.

A "therapeutically effective amount" refers to an amount effective, at dosages and for periods of time necessary, to achieve the desired therapeutic result, such as treatment or prevention of a disease or condition associated with or exacerbated by blood sugar level excursions. A therapeutically effective amount of a composition may vary according to factors such as the disease state, age, sex, and weight of the subject, and the ability of the composition to elicit a desired response in the subject.

The terms "treat", "treating" and "treatment" as used herein refer to a method of alleviating or abrogating a condition, disorder, or disease and/or the attendant symptoms thereof.

B. Methods for Manufacturing Sweetener Compositions

In at least one aspect, this disclosure is directed to a method for manufacturing a sweetener composition.

In certain embodiments, the method comprises providing raw palm sap. In some such embodiments, the sap is from a palm and, in particular, a palm of the *Borassus* (palmyra) species. In some such embodiments, the species is *Borassus Flabellifer*. In certain embodiments, the source of the palm sap is a non-genetically modified organism. In certain embodiments, a secretion (toddy) of the *Borassus* species is obtained by tapping the tip of the inflorescence. In certain embodiments, the inside of the toddy-collecting receptable is rubbed with lime paste to prevent fermentation. The sap is referred to as sweet toddy and can concentrated or crude sugar (also known as gur or jaggery).

In certain embodiments, the method comprises heating the raw palm sap at a temperature and for a time period sufficient to form a concentrate. In some such embodiments, the temperature is at least 80° C., at least 90° C., at least 100° C., or at least 110° C. In some such embodiments, the temperature is from about 80° C. to about 120° C. In some such embodiments, the time period is at least 30 minutes, at least 60 minutes, at least 90 minutes, or at least 120 minutes. In some such embodiments, the time period is from about 60 minutes to about 180 minutes.

In certain embodiments, the method comprises partially drying the concentrate to obtain a partially dried intermediate. In some such embodiments, the concentrate is partially dried by air drying. In some such embodiments, the concentrate is partially dried by spray drying. In some such embodiments, the inlet air temperature in the spray drying process is from about 100° C. to about 150° C., such as about 110° C., about 120° C., about 130° C., or about 140° C.

In certain embodiments, the method comprises milling the concentrate and/or the partially dried intermediate to obtain granules. In some such embodiments, the milling step is performed using a mortar and pestle. In some such embodiments, the milling step is performed using a conical mill (e.g., Comil®). In some such embodiments, the milling step is performed using a micronizer.

In certain embodiments, the method comprises drying the granules to provide granules having a moisture content of 5% or less. In some such embodiments, the method comprises drying the granules to provide granules having a moisture content of 2% or less. In some such embodiments, the granules are dried to the desired moisture content by air drying. In some such embodiments, the granules are dried to the desired moisture content by spray drying. In some such embodiments, the inlet air temperature in the spray drying process is from about 100° C. to about 150° C., such as about 110° C., about 120° C., about 130° C., or about 140° C.

In certain embodiments, the method comprises sieving the dried granules. In some such embodiments, the dried granules are sieved through a mesh screen. For example, the mesh screen may be a 5 mesh to 50 mesh screen, preferably a 20 mesh screen.

In certain embodiments, the dried granules retain at least one nutrient, wherein the at least one nutrient is selected from the group consisting of a vitamin, a mineral, a phytonutrient, and a combination thereof. In some such embodiments, the vitamin is selected from the group consisting of Vitamin $B_1$, Vitamin $B_2$, Vitamin $B_3$, Vitamin $B_6$, Vitamin $B_{12}$, and a combination thereof. In some such embodiments, the mineral is selected from the group consisting of iron, potassium, magnesium, calcium, zinc, and a combination thereof.

C. Sweetener Compositions

In at least one aspect, this disclosure is directed to a sweetener composition, wherein the composition comprises not more than 5% water by weight and optionally comprises (a) at least 0.1 microgram of Vitamin $B_{12}$ per 100 grams of the composition and/or (b) at least 1 milligram of iron per 100 grams of the composition. The disclosed sweetener compositions may be prepared by any suitable method, including those described herein.

In certain embodiments, the composition comprises not more than 4%, alternatively not more than 3%, or alternatively not more than 2% water by weight. In certain embodiments, the composition comprises from about 0.1% to about 5%, alternatively from about 0.5% to about 4%, or alternatively from about 1% to about 3% water by weight.

In certain embodiments, the composition comprises at least one nutrient, wherein the at least one nutrient is selected from the group consisting of a vitamin, a mineral, a phytonutrient, and a combination thereof. In some such embodiments, the vitamin is selected from the group consisting of Vitamin $B_1$, Vitamin $B_2$, Vitamin $B_3$, Vitamin $B_6$, Vitamin $B_{12}$, and a combination thereof. In some such embodiments, the mineral is selected from the group consisting of iron, potassium, magnesium, calcium, zinc, and a combination thereof.

In certain embodiments, the composition comprises at least 0.1 microgram of Vitamin $B_{12}$ per 100 grams of the composition and/or (b) at least 1 milligram of iron per 100 grams of the composition. In some such embodiments, the composition comprises from about 0.1 microgram to about 10 micrograms of Vitamin $B_{12}$ per 100 grams of the composition and/or (b) from about 1 milligram to about 5 milligrams of iron per 100 grams of the composition.

Preferred ranges for B vitamins (including $B_1$, $B_2$, $B_3$, $B_6$, and $B_{12}$) and mineral content of the composition are presented below.

| B vitamin | | μg/100 g |
|---|---|---|
| B1 | thiamin | 300-1300 |
| B2 | riboflavin | 250-1000 |
| B3 | nicotinic acid | 1000-3750 |
| B5 | pantothenic acid | 250-1500 |
| B6 | pyridoxine | 1300-5000 |
| B7 | biotin | 1-30 |
| B9 | folate | 0.1-10 |
| B12 | cyanocobalamin | 0.1-10 |

| Mineral | mg/100 g |
|---|---|
| Fe | 1-5 |
| K | 25-500 |
| Mg | 5-150 |
| Ca | 5-150 |

In certain embodiments, the sweetener composition comprises granules derived from sap of a *Borassus* (palmyra) species. In some such embodiments, the species is *Borassus Flabellifer.*

In certain embodiments, the sweetener composition comprises an additional sweetening agent. For example, the sweetener composition may comprise granules derived from sap of a *Borassus* (palmyra) species and an additional sweetening agent. In some such embodiments, the additional sweetening agent has less sweetness than or similar sweetness to sucrose. In some such embodiments, the additional sweetening agent is a plant-based sweetening agent. In some such embodiments, the additional sweetening agent is a polyol such as erythritol or sorbitol. In some such embodiments, the additional sweeting agent is a rare sugar such as tagatose. In some such embodiments, the additional sweetening agent is a low-calorie monosaccharide sugar, such as allulose. In some such embodiments, the additional sweetening agent is selected from the group consisting of allulose, inulin, mogroside, raffinose, steviol, tagatose, and trehalose.

In certain embodiments, the sweetener composition comprises one or more excipients such as excipients that function as binders, glidants, lubricants, stabilizers, and fillers. Thus, a sweetener composition may further optionally comprise one or more nutraceutically or pharmaceutically acceptable excipients.

In certain embodiments, the sweetener composition comprises at least one excipient that functions as a glidant. A glidant may be added to improve the flowability of the composition. Suitable glidants include, without limitation, silica and silica derivatives including colloidal silicon dioxide (e.g., Aerosil®), magnesium trisilicate, tribasic calcium phosphate powdered cellulose, talc, and combinations thereof. In a particular embodiment, the glidant is silicone dioxide.

In certain embodiments, a glidant is present in the sweetener composition in an amount from about 0.1% to about 10% by weight (w/w). In certain embodiments, a glidant is present in the solid dosage form in an amount from about 0.3% to about 5% by weight (w/w). In certain embodiments, a glidant is present in the solid dosage form in an amount from about 0.5% to about 3% by weight (w/w). In certain embodiments, the glidant is colloidal silicon dioxide In certain embodiments, the sweetener composition comprises granules derived from sap of a *Borassus* (palmyra) species, an additional sweetening agent, and a glidant. In some such embodiments, the granules are prepared by processes disclosed herein. In some such embodiments, the additional sweetening agent is allulose. In some such embodiments, the glidant is silicone dioxide.

In certain embodiments, the sweetener composition, upon ingestion by a subject, lowers hemoglobin A1c (HbA1c) levels, increases hemoglobin (Hb) levels, and/or increases red blood cell count in the subject at specific periods after administration.

D. Products Containing Sweetener Compositions

In at least one aspect, this disclosure is directed to a product comprising a sweetener composition disclosed herein and/or a sweetener composition manufactured by a method disclosed herein. In certain embodiments, the product is provided as discrete units such as blocks, tablets, capsules, pouches, or sachets, each containing a predetermined amount of the sweetener composition.

In certain embodiments, the product comprises granules. In some such embodiments, the granules are light brown granules. The granules may be packaged in bulk or in individual units for consumption (e.g., in pouches or sachets). In certain embodiments, the granules are intended to be mixed with a food product or beverage (e.g., as a drink preparation). The food product or beverage may be intended for human or animal consumption.

In certain embodiments, the sweetener composition is incorporated into a food or beverage and the product is a prepared food item or a ready-to-drink beverage.

In certain embodiments, the product is a prepared food item. Exemplary prepared food items include, but are not limited to, bars, biscuits, cheese, chews, chocolate, cookies, dips, gummies, ice cream, pudding, sauces, and soups. In some such embodiments, the prepared food item does not require cooking after admixture with the sweetener composition.

In certain embodiments, the product is an RTD beverage. Exemplary RTD beverages include, but are not limited to, dairy beverages, juices, and tea beverages.

In certain embodiments, the product is a drink preparation, such as a powder or granule. The powder or granule can be mixed with any suitable liquid or semi-frozen slurry for ingestion such as water, coffee, and the like.

In certain embodiments, the product is an animal feed or an animal feed supplement.

Sweetener compositions, as described herein, can be formulated as a nutraceutical composition, such as a medical food, a nutritional or dietary supplement, a food or beverage product, and include a nutraceutically acceptable carrier. As used herein, a "nutraceutically acceptable carrier" refers to, and includes, any and all solvents, dispersion media, coatings, antibacterial and antifungal agents, isotonic and absorption delaying agents, and the like that are physiologically compatible. In some embodiments, the nutraceutically acceptable carrier is suitable for pediatric use.

In certain embodiments, the nutraceutical composition is orally ingestible and in the form of a powder or granule (optionally contained within a pouch or sachet), tablet, or capsule intended to be ingested directly or mixed with a food, a liquid, or a semi-frozen slurry for ingestion.

E. Methods of Use

In at least one aspect, the present disclosure includes a method for lowering hemoglobin A1c (HbA1c) levels in a subject in need thereof. In certain embodiments, the subject is a subject with diabetes or at risk for developing diabetes, particularly Type 2 diabetes.

The method comprises orally administering to a subject in need thereof an effective amount of a sweetener composition disclosed herein and/or a sweetener composition manufactured by a method disclosed herein. In certain embodiments, the sweetener composition is provided as a consumable product (e.g., food product, a beverage, or a mix product intended to be combined with a food or beverage). In some such embodiments, the food product is a bar, a cookie, a muffin, or the like. In some such embodiments, the beverage is a ready-to-drink (RTD) beverage such as a juice, a shake, or the like in which the sweetener composition has been dissolved. In some such embodiments, the mix product is in the form of a tablet, pellet, powder, granule, or the like which can be added to a food or beverage (e.g., by dissolving the sweetener composition in a liquid or a semi-frozen slurry).

In certain embodiments, the oral administration occurs daily for at least 4, 8, 12, 24, or 48 weeks. In some such embodiments, the oral administration occurs daily for 12 weeks or more.

In certain embodiments, the subject's HbA1c level is less than 7% following oral administration of a sweetener composition disclosed herein and/or a sweetener composition manufactured by a method disclosed herein for 8 or more, alternatively 12 or more, weeks.

Without wishing to be bound by theory, it is believed that the sweetener composition disclosed herein and/or a sweetener composition manufactured by a method disclosed herein has a low glycemic index (about 40) and is an effective agent for glycemic control.

In at least one aspect, the present disclosure includes a method for increasing hemoglobin (Hb) levels and/or red blood cell count in a subject in need thereof. In certain embodiments, the subject is a subject with anemia or at risk for developing anemia, particularly iron deficiency anemia.

The method comprises orally administering to a subject in need thereof an effective amount of a sweetener composition disclosed herein and/or a sweetener composition manufactured by a method disclosed herein. In certain embodiments, the sweetener composition is provided as a consumable product (e.g., food product, a beverage, or a mix product intended to be combined with a food or beverage). In some such embodiments, the food product is a bar, a cookie, a muffin, or the like. In some such embodiments, the beverage is a ready-to-drink (RTD) beverage such as a juice, a shake, or the like in which the sweetener composition has been dissolved. In some such embodiments, the mix product is in the form of a tablet, pellet, powder, granule, or the like which can be added to a food or beverage (e.g., by dissolving the sweetener composition in a liquid or a semi-frozen slurry).

In certain embodiments, the oral administration occurs daily for 8 weeks or more. In certain embodiments, the oral administration occurs daily for at least 1, 2, 3, 4, 5, 6, 7, or 8 weeks.

In certain embodiments, the sweetener composition is administered with an iron-rich food such as raisins. A combination of the sweetener composition and an iron-rich food is useful to overcome anemia, particularly iron deficiency anemia. See, e.g., Sakthibalan et al., Natl J Physiol Pharm Pharmacol. 8(10):1432-1436 (2018).

Without wishing to be bound by theory, it is believed that the sweetener composition disclosed herein and/or a sweetener composition manufactured by a method disclosed herein improves the hemoglobin levels in anemia, particularly iron deficiency anemia.

In at least one aspect, the present disclosure includes a method for treating or preventing a disease or condition associated with or exacerbated by blood sugar level excursions in a subject in need of such treatment or prevention. In certain embodiments, the disease or condition is diabetes, particularly Type 2 diabetes.

The method comprises orally administering to a subject in need thereof a therapeutically effective amount of a sweetener composition disclosed herein and/or a sweetener composition manufactured by a method disclosed herein. In certain embodiments, the sweetener composition is provided as a consumable product (e.g., food product, a beverage, or a mix product intended to be combined with a food or beverage). In some such embodiments, the food product is a bar, a cookie, a muffin, or the like. In some such embodiments, the beverage is a ready-to-drink (RTD) beverage such as a juice, a shake, or the like in which the sweetener composition has been dissolved. In some such embodiments, the mix product is in the form of a tablet, pellet, powder, granule, or the like which can be added to a food or beverage (e.g., by dissolving the sweetener composition in a liquid or a semi-frozen slurry).

In certain embodiments, the oral administration occurs daily for at least 4, 8, 12, 24, or 48 weeks. In some such embodiments, the oral administration occurs daily for 12 weeks or more.

Conventional pharmaceutical or nutraceutical practice may be employed to provide suitable formulations or compositions to administer the sweetener composition, as described herein, to a subject.

Exemplary total daily doses of the sweetener composition include at least 1 gram (g)/day, alternatively, at least 2 g/day, alternatively, at least 4 g/day, alternatively, at least 6 g/day, alternatively, at least 8 g/day, alternatively, at least 10 g/day, alternatively, at least 15 g/day, or, alternatively, at least 20 g/day. In certain embodiments, the total daily dose of sweetener composition is from about 1 g/day to about 50 g/day, alternatively, from about 2 g/day to about 25 g/day, alternatively, from about 3 g/day to about 15 g/day, or, alternatively, from about 4 g/day to about 10 g/day. Compositions containing the sweetener composition may be administered in amount to provide such total daily doses.

The sweetener composition, whether in the form of a composition or food product or dissolved in a RTD or prepared beverage, may be administered to the subject in a single dose per day or in multiple doses per day such as, for example, 2 times per day, 3 times per day, or 4 times per day.

Factors affecting the preferred dosage regimen include the type, age, weight, sex, diet, and condition of the subject, the desired effect to be achieved, and/or the severity of any disease or condition desired to be treated or prevented. Thus, the dosage regimen actually employed can vary widely, and therefore, can derive from the preferred dosage regimen set forth above.

F. Examples

The manufacturing methods and sweetener compositions described herein will be better understood by reference to the following examples, which are included as an illustration of and not a limitation upon the scope of the invention.

Example 1: Exemplary Manufacturing Process for Sweetener Composition

FIG. 1 depicts an exemplary method 100 for manufacturing a sweetener composition. In step 102, a raw material (e.g., raw palm sap) is provided. In step 104, the raw material is boiled at a temperature and for a time period sufficient to form a concentrate. For example, the raw material can be boiled at a temperature of at least 100° C. for about 2 hours. In optional step 106, the concentrate is partially dried to obtain a partially dried intermediate. In step 108, the concentrate and/or the partially dried intermediate is milled into a granular form. In step 110, the milled granules are dried until the moisture content is 5% or less. In step 112, the dried granules are sieved. In step 114, the sieved granules are inspected and packaged (e.g., in double food grade plastic bags).

Example 2: Sweetener Composition

Light brown granules were obtained by processing sap from a *Borassus* (palmyra) palm as described herein.

Product parameters, including physical characteristics and microbiological and pathogen analysis, are provided in Table A.

TABLE A.

| Parameter | Specification | Reference |
|---|---|---|
| Physical Characteristics | | |
| Appearance & Color | Light brown granules powder with characteristic odor | Internal |
| Sugar Sweetener Level | 1:1 | Internal |
| Solubility | Dispersible in water | Internal |
| Powder size | >95% pass through 20 Mesh | Internal |
| Moisture | ≤5% | FCC IXth Ed. |
| Microbiological and pathogen Analysis | | |
| Total Plate Count | <5000 cfu/gm | As per USP <2021> |
| Total Yeast & Molds | <1000 cfu/gm | As per USP <2021> |
| *Escherichia coli* | <3 MPN/g | As per USP <2022> |
| *Salmonella* | Absent in 25 gm | As per USP <2022> |

Example 3: Nutrition Content of Processed Granules

Granules prepared according to the methods described herein were determined to have a moisture content of 1.76%. Energy value was determined to be 377 kcal per 100 grams.

Vitamin content was assessed and reported as a percent daily value in the following tables.

TABLE B

Vitamin B Content.

| B vitamin | | % DV (per 100 g) |
|---|---|---|
| B1 | thiamin | 56.67 |
| B2 | riboflavin | 37.69 |
| B3 | nicotinic acid | 12.19 |
| B3 | nicotinamide | 8.81 |
| B5 | pantothenic acid | 9.8 |
| B6 | pyridoxine | 155.88 |
| B7 | biotin | 6.33 |
| B9 | folate | 1.12 |
| B12 | cyanocobalamin | 39.67 |

TABLE C

Vitamin Content

| Vitamin | % DV |
|---|---|
| A | 0.1% per kg |
| C | 11% per kg |
| D | 4.5% per kg |
| E | 0.6% per 100 g |
| K | 17.33 per 100 g |

Example 4: Mineral Content of Processed Granules

Granules prepared according to the methods described herein were determined to have a moisture content of 1.76%. Energy value was determined to be 387 kcal per 100 grams.

Mineral content was assessed and reported as a percent daily value in the following table.

TABLE D

| Mineral Content. | |
|---|---|
| Mineral | % DV (per 100 g) |
| Fe | 15.11 |
| K | 5.69 |
| Mg | 16.9 |
| Ca | 1.5 |

Example 5: Clinical Study in Diabetic Patients

The efficacy and safety of a sweetener composition disclosed herein is evaluated in Type 2 Diabetic Patients. The study design is a randomized, open labeled, multi-center, comparative, interventional, prospective clinical study.

The primary study objectives are: (1) assessment of changes in HbA1C (Glycosylated Hemoglobin) value (pre and post); (2) assessment of monthly changes in fasting & postprandial plasma glucose levels over three months of study treatment; and (3) assessment of caloric value.

The secondary study objectives are: (1) to compare change in HOMA IR score between the two groups (Before and after treatment); (2) to compare change in fasting serum Insulin level between the groups (Before and after treatment); (3) to compare monthly change in dose of oral hypoglycemic agents (OHAs) between the groups; (4) to compare monthly change in weight, BMI, waist circumference, Hip Circumference, waist: Hip ratio, Basal Metabolic Rate (BMR), Body fat percentage (Instrumental evaluation) between the groups; (5) to compare changes in clinical symptoms of Type 2 DM (i.e., Polydypsia, Polyphagia, Polyurea, & Fatigue) between the groups; (6) to compare global assessment for overall change by subject and investigator at the end of 3 months of study treatment between the groups; (7) to compare tolerability of study drug by assessing ADRs on study completion between the groups; (8) assessment of changes in biomarkers like CRP, HS-CRP and Vitamin $B_{12}$; and (9) assessment of Laboratory parameters like Liver function tests (LFT), Renal function tests (RFT), Lipid profile (Serum Triglycerides, Serum Cholesterol, LDL, HDL, VLDL etc.), complete blood count (CBC), ESR, Hb %, Urine Examination and ECG on study completion between the groups.

Seventy-two (72) subjects (36 subjects in each group) will be enrolled to get 60 evaluable cases (30 in each group) at the end of the study, assuming a 20% dropout rate.

Diagnosis and Main Criteria for Inclusion.

Males and females in the age group of 20-70 years, suffering from Type 2 Diabetes Mellitus for more than one year, and stabilized on mono/polydrug anti-diabetic therapy for at least last 3 months. In addition, at screening visit, patient should have their fasting blood glucose in the range of 126-252 mg/dl, HbA1C in range of 7-11%, and ECG not demonstrating any signs of uncontrolled arrhythmia/acute ischemia and X-ray chest not showing any active lesion of tuberculosis. A urine pregnancy test is required for all female subjects unless subject has had a hysterectomy, tubal ligation, or is >2 years postmenopausal.

Study Groups and Treatment:

Group A: oral hypoglycemic agents (OHAs)+sweetener composition for three months

Group B: OHAs for three months

Visit Schedule:

Screening Visit (Day −3), Baseline Visit (Day 0), Visit I (Day 30), Visit II (Day 60), Visit III (Day 90).

The assessment schedule for each visit is shown in Table E below.

TABLE E

| Activity | Screening Visit (Day −7) | Baseline Visit (Day 0) | Visit 1 (Day 30) ±5 days | Visit 2 (Day 60) ±5 days | Visit 3 (Day 90) ±5 days |
|---|---|---|---|---|---|
| Assessment of Inclusion/ Exclusion Criteria | ✓ | ✓ | X | X | X |
| Written Informed Consent | ✓ | X | X | X | X |
| Demographic Data and History | ✓ | X | X | X | X |
| Randomization | X | ✓ | X | X | X |
| Physical and general examinations | ✓ | ✓ | ✓ | ✓ | ✓ |
| Assessment of Clinical Symptoms of diabetes | ✓ | ✓ | ✓ | ✓ | ✓ |
| Assessment of Quality of Life on QOL (Diabetes) | X | ✓ | ✓ | ✓ | ✓ |
| HOMA IR Score | X | ✓ | X | X | ✓ |
| Assessment of weight, BMI, waist circumference, Hip Circumference, waist: Hip ratio, Basal Metabolic Rate (BMR) | ✓ | ✓ | ✓ | ✓ | ✓ |
| * Lab Investigations | ✓ | X | ✓ | ✓ | ✓ |
| X-Ray Chest (PA view) | ✓ | X | X | X | X |
| ECG | ✓ | X | X | X | ✓ |
| Drug Dispensing | X | ✓ | ✓ | ✓ | X |
| Assessment of Dose of OHAs | X | ✓ | ✓ | ✓ | X |
| Global assessment for overall change by the Investigator and by Subjec t | X | X | X | X | ✓ |

TABLE E-continued

| Activity | Screening Visit (Day −7) | Baseline Visit (Day 0) | Visit 1 (Day 30) ±5 days | Visit 2 (Day 60) ±5 days | Visit 3 (Day 90) ±5 days |
|---|---|---|---|---|---|
| Safety assessment and ADR/Adverse Events monitoring | X | ✓ | ✓ | ✓ | ✓ |
| Drug Compliance | X | X | ✓ | ✓ | ✓ |
| Completion signature | X | X | X | X | ✓ |

The laboratory investigations performed at each visit are shown in Table F below.

TABLE F

Laboratory investigations.

| Investigation | Screening Visit (Day −7) | Baseline Visit (Day 0) | Visit 1 (Day 30) | Visit 2 (Day 60) | Visit 3 (Day 90) |
|---|---|---|---|---|---|
| CBC, ESR, Hb % | ✓ | X | X | X | ✓ |
| BSL-Fasting & PP | ✓ | X | ✓ | ✓ | ✓ |
| Serum Insulin | ✓ | X | X | X | ✓ |
| Glycosylated Haemoglobin (HbA1C %) | ✓ | X | X | X | ✓ |
| Liver Function Tests (LFT): [SGOT, SGPT, Sr. Bilirubin (Total, Direct, Indirect) Sr. Alkaline phosphatase] | ✓ | X | X | X | ✓ |
| Renal Function Tests (RFT): [Sr. Creatinine & BUN] | ✓ | X | X | X | ✓ |
| Lipid Profile: [Total sr. cholesterol, sr. triglycerides, LDL, HDL, VLDL] | ✓ | X | X | X | ✓ |
| HIV I & II | ✓ | X | X | X | X |
| Urine sugar (Fasting & PP) | ✓ | X | ✓ | ✓ | ✓ |
| CRP, HS-CRP | ✓ | X | X | X | ✓ |
| Vitamin B12 | ✓ | X | X | X | ✓ |
| Urine Routine & Microscopic | ✓ | X | X | X | ✓ |
| Urine Pregnancy Test | ✓ | X | X | X | X |

It will be readily apparent to those skilled in the art that other suitable modifications and adaptations of the compositions and methods of the invention described herein may be made using suitable equivalents without departing from the scope of the invention or the embodiments disclosed herein.

It is understood that the foregoing detailed description and accompanying examples are merely illustrative and are not to be taken as limitations upon the scope of the invention, which is defined solely by the appended claims and their equivalents. Various changes and modifications to the disclosed embodiments will be apparent to those skilled in the art. Such changes and modifications, including without limitation those relating to the chemical structures, substituents, derivatives, intermediates, syntheses, formulations, or methods, or any combination of such changes and modifications of use of the invention, may be made without departing from the spirit and scope thereof.

All references (patent and non-patent) cited above are incorporated by reference into this patent application. The discussion of those references is intended merely to summarize the assertions made by their authors. No admission is made that any reference (or a portion of any reference) is relevant prior art (or prior art at all). Applicant reserves the right to challenge the accuracy and pertinence of the cited references.

What is claimed is:

1. A process for manufacturing a sweetener composition, the process comprising the steps of:

(a) providing raw palm sap;

(b) heating the raw palm sap at a temperature and for a time period sufficient to form a concentrate;

(c) partially drying the concentrate to by spray drying obtain a partially dried intermediate;

(d) milling the partially dried intermediate of step (c) to obtain granules; and (e) spray drying the granules to provide granules having a moisture content of 5% or less.

2. The process of claim 1, wherein step (e) comprises drying the granules to provide granules having a moisture content of 2% or less.

3. The process of claim 1, wherein step (c) comprises air drying or spraying drying the concentrate.

4. The process of claim 1, wherein step (e) comprises air drying or spraying drying the concentrate.

5. The process of claim 1, wherein the sweetener composition comprises at least one nutrient, wherein the at least one nutrient is selected from the group consisting of a vitamin, a mineral, a phytonutrient, and a combination thereof.

6. The process of claim 5, wherein the vitamin is selected from the group consisting of Vitamin $B_1$, Vitamin $B_2$, Vitamin $B_3$, Vitamin $B_6$, Vitamin $B_{12}$, and a combination thereof.

7. The process of claim 5, wherein the mineral is selected from the group consisting of iron, potassium, magnesium, calcium, zinc, and a combination thereof.

8. The process of claim 1, wherein the temperature in step (b) is from about 80° C. to about 120° C.

9. The process of claim 1, wherein the time period in step (b) is at least 2 hours.

10. The process of claim 1, wherein step (c) comprises spraying drying the concentrate.

11. The process of claim 10, wherein the spraying drying is at a temperature from about 100° C. to about 150° C.

12. The process of claim 1, wherein step (e) comprises spraying drying the concentrate.

13. The process of claim 12, wherein the spraying drying is at a temperature from about 100° C. to about 150° C.

14. The process of claim 1, wherein the sweetener composition comprises a vitamin selected from the group consisting of Vitamin $B_1$, Vitamin $B_2$, Vitamin $B_3$, Vitamin $B_6$, Vitamin $B_{12}$, and a combination thereof and a mineral selected from the group consisting of iron, potassium, magnesium, calcium, zinc, and a combination thereof.

15. The process of claim 1, wherein the sweetener composition comprises a comprises (i) at least 0.1 microgram of Vitamin B12 per 100 grams of the composition and (ii) at least 1 milligram of iron per 100 grams of the composition.

16. The process of claim 1, further comprising combining the dried granules obtained in step (e) with a glidant.

17. The process of claim 16, wherein the glidant is silicone dioxide.

18. The process of claim 1, further comprising combining the dried granules obtained in step (e) with an additional sweetening agent selected from the group consisting of allulose, inulin, mogroside, raffinose, steviol, tagatose, and trehalose.

19. A process for manufacturing a sweetener composition, the process comprising the steps of:

(a) providing raw palm sap;

(b) heating the raw palm sap at a temperature from about 80° C. to about 120° C. for about 60 minutes to about 180 minutes to form a concentrate;

(c) spray drying the concentrate at a temperature from about 100° C. to about 150° C. to obtain a partially dried intermediate;

(d) milling the partially dried intermediate of step (c) to obtain granules;

(e) spray drying the granules at a temperature from about 100° C. to about 150° C. to provide granules having a moisture content of 5% or less; and (f) sieving the dried granules.

20. The process of claim 19, further comprising combining the sieved dried granules obtained in step (f) with a glidant and an additional sweetening agent selected from the group consisting of allulose, inulin, mogroside, raffinose, steviol, tagatose, and trehalose.

* * * * *